June 17, 1941.    E. E. EICKMEYER ET AL    2,245,767
SINGLE CONTROL SOFTENER VALVE
Filed May 23, 1938    10 Sheets-Sheet 5

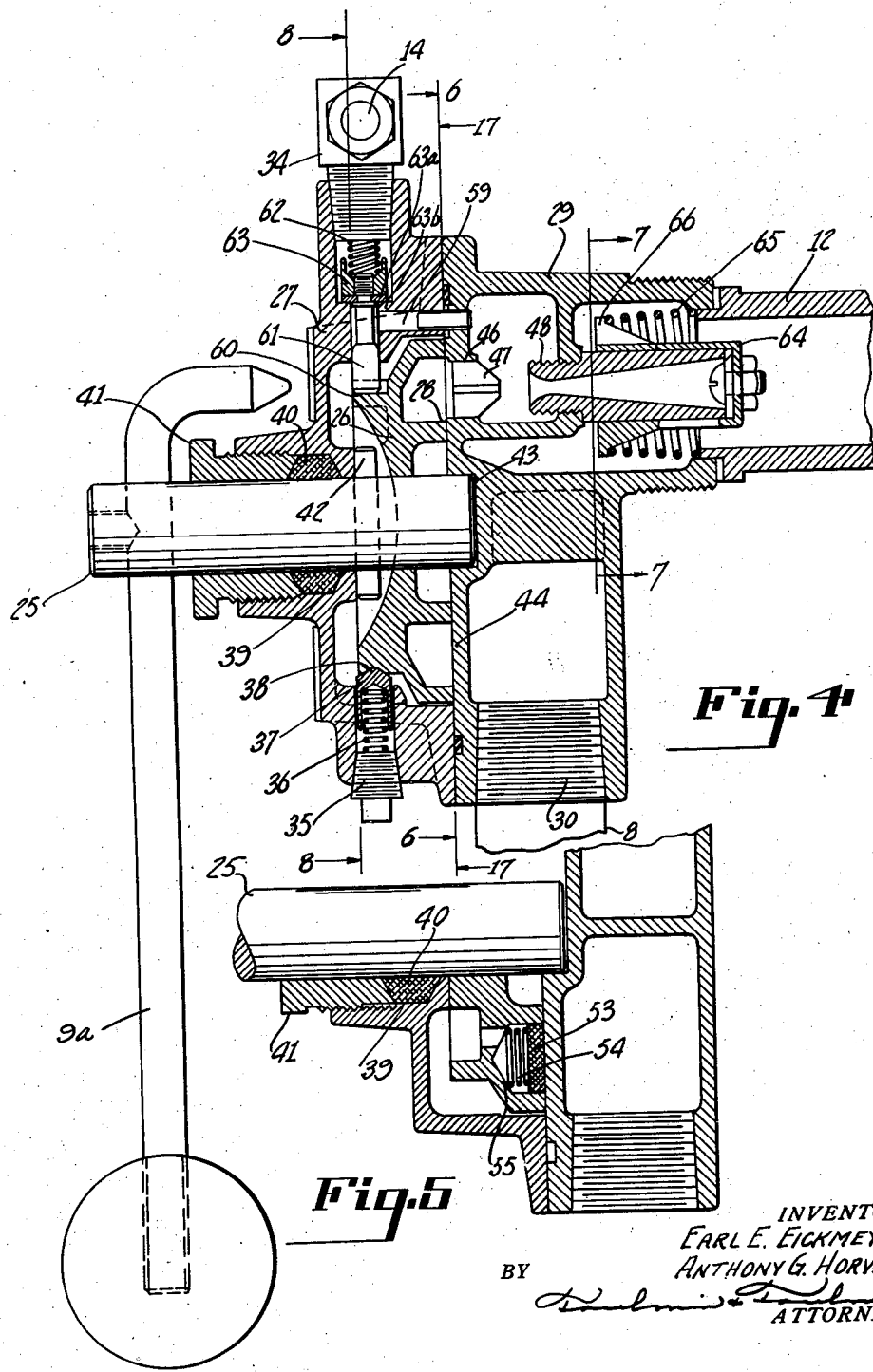

INVENTOR
EARL E. EICKMEYER
ANTHONY G. HORVATH
BY
ATTORNEYS

INVENTOR
EARL E. EICKMEYER
ANTHONY G. HORVATH
BY
ATTORNEYS

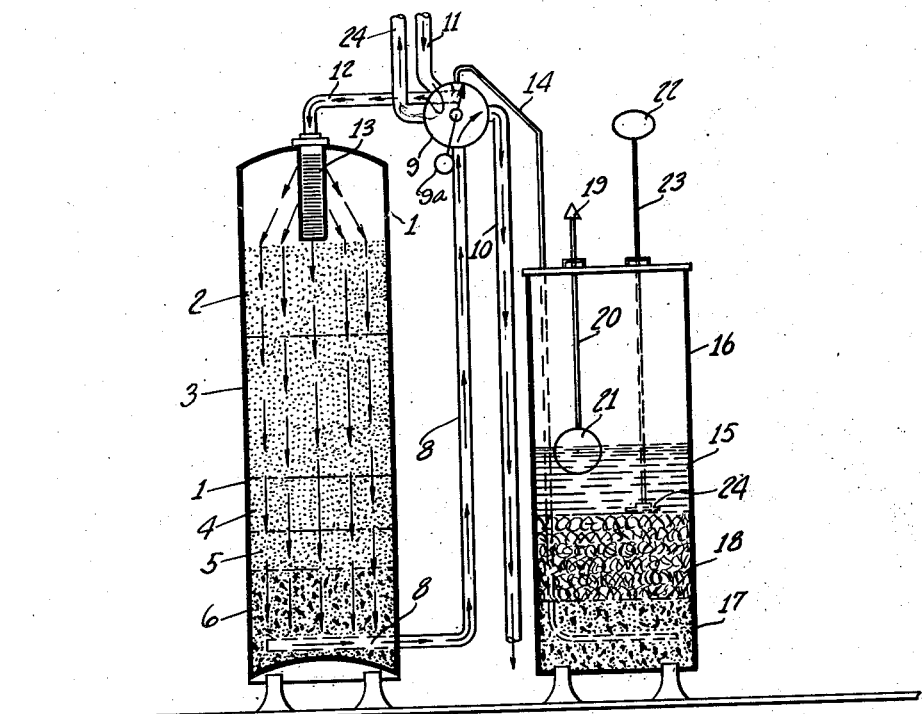
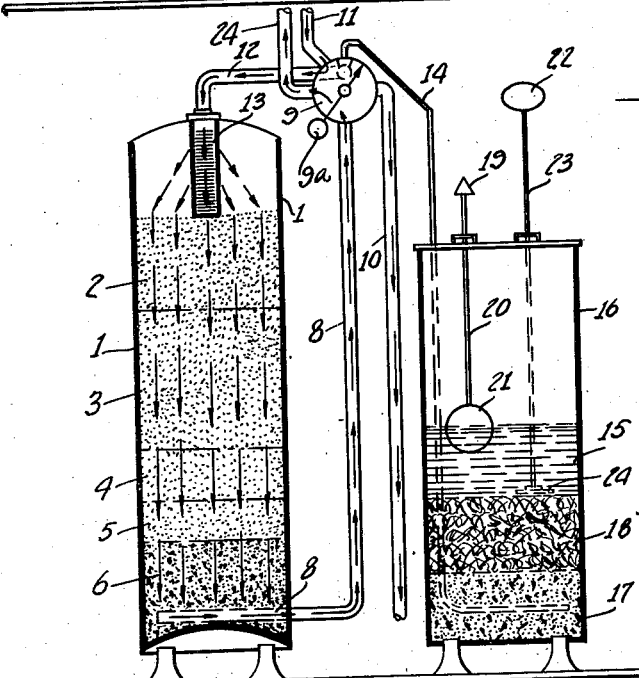
Fig. 9
Fig. 10
INVENTOR
EARL E. EICKMEYER
ANTHONY G. HORVATH
BY
ATTORNEYS June 17, 1941.  E. E. EICKMEYER ET AL  2,245,767
SINGLE CONTROL SOFTENER VALVE
Filed May 23, 1938   10 Sheets-Sheet 8

INVENTOR
EARL E. EICKMEYER
ANTHONY G. HORVATH.
BY
ATTORNEYS

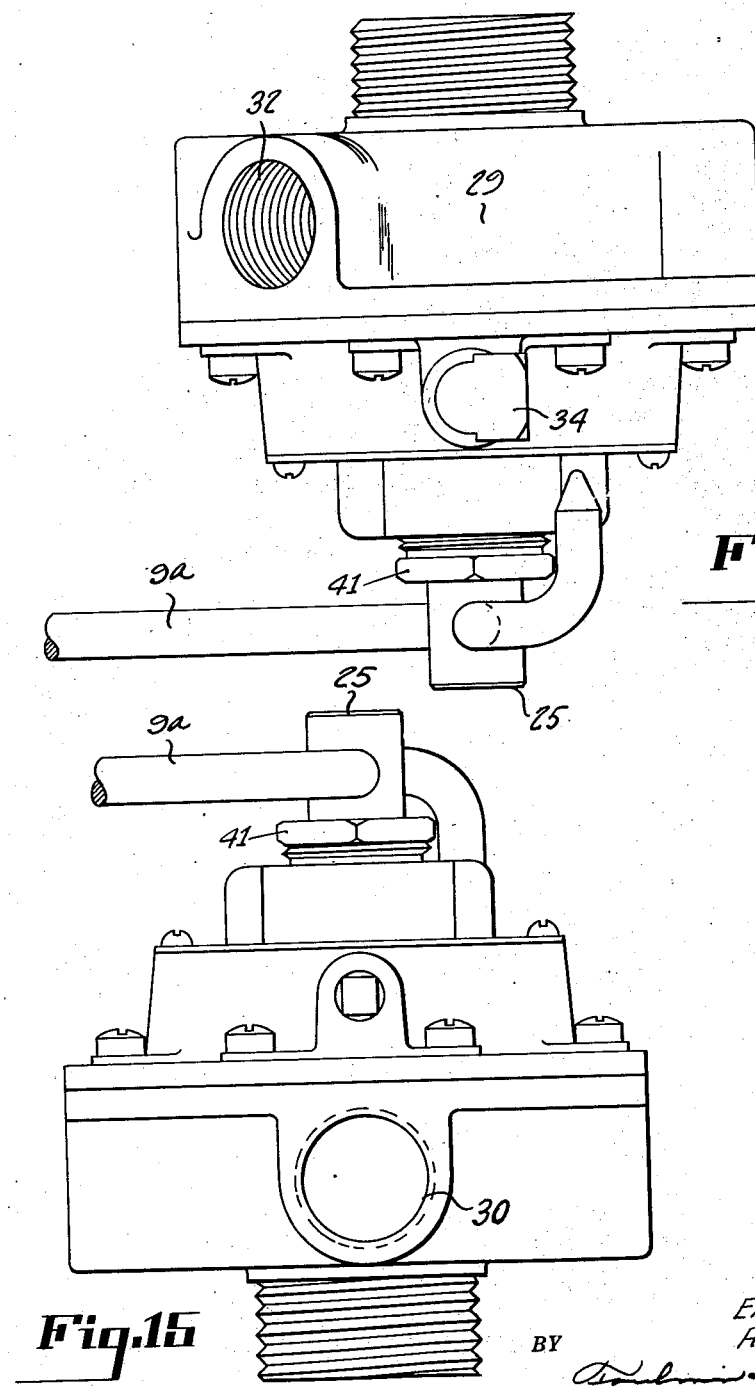

INVENTOR
EARL E. EICKMEYER
ANTHONY G. HORVATH.
BY
ATTORNEYS

Patented June 17, 1941

2,245,767

UNITED STATES PATENT OFFICE 2,245,767

SINGLE CONTROL SOFTENER VALVE

Earl E. Eickmeyer and Anthony G. Horvath, Dayton, Ohio, assignors to The Dayton Pump and Mfg. Company, Dayton, Ohio, a corporation of Ohio Application May 23, 1938, Serial No. 209,458

5 Claims. (Cl. 210—24)

This invention relates to water softening and water conditioning apparatus.

It is the object of this invention to provide a unitary control for the control of the successive operations of refilling, brining, washing and softening.

The particular object of the invention is the provision of a brine valve as an integral part of the single control valve.

It is also an object of the invention to provide means for the upward wash of the mineral bed during the refill period of refilling the brine tank.

It is an object to provide the brine tank with hard water immediately before the regenerating process and not afterwards, as heretofore has been the practice in the art. When the refilling operation takes place before the regenerating process, there is thereby compelled automatically the upward back wash and cleaning of the mineral bed.

It is a further object to provide a check valve in the injector throat to prevent the washed water which flows upwardly through the mineral from contaminating the clean hard water which flows through the jet and thence through the brine valve into the brine tank.

An additional feature of this invention is double washing of the mineral bed in opposite directions: the first wash is in the reverse direction to softening, that is upwardly and carries sediment from the top of the mineral bed to drain during the refill operation, and the second wash is subsequent to brining and in the reverse direction, that is downwardly, whence the brine and any remaining sediment goes to drain. The advantage of this double washing is the removal of accumulated sediment on top of the filter softening body prior to brining to permit the active reaction of the brine directly on the magnesium and calcium salts without being impeded by any coating of sediment on the mineral.

The further object is to remove the free salts of magnesium and calcium with any accumulated sediment by the final washing after brining so that hard water when it is passed through the mineral to be softened will not be contaminated and can be actively softened by clean, regenerated mineral.

Referring to the drawings:

Figure 4 is a section on the line 4—4 of Figure 2.

Figure 5 is a detailed section showing a modification of the valve structure.

Figure 9 is a diagrammatic view showing the direction of flow of the water during washing.

Figure 10 is a similar view showing the direction of flow during softening.

Figure 15 is a bottom plan view of the valve of Figure 2.

Figure 16 is a top plan view.

Figure 1:
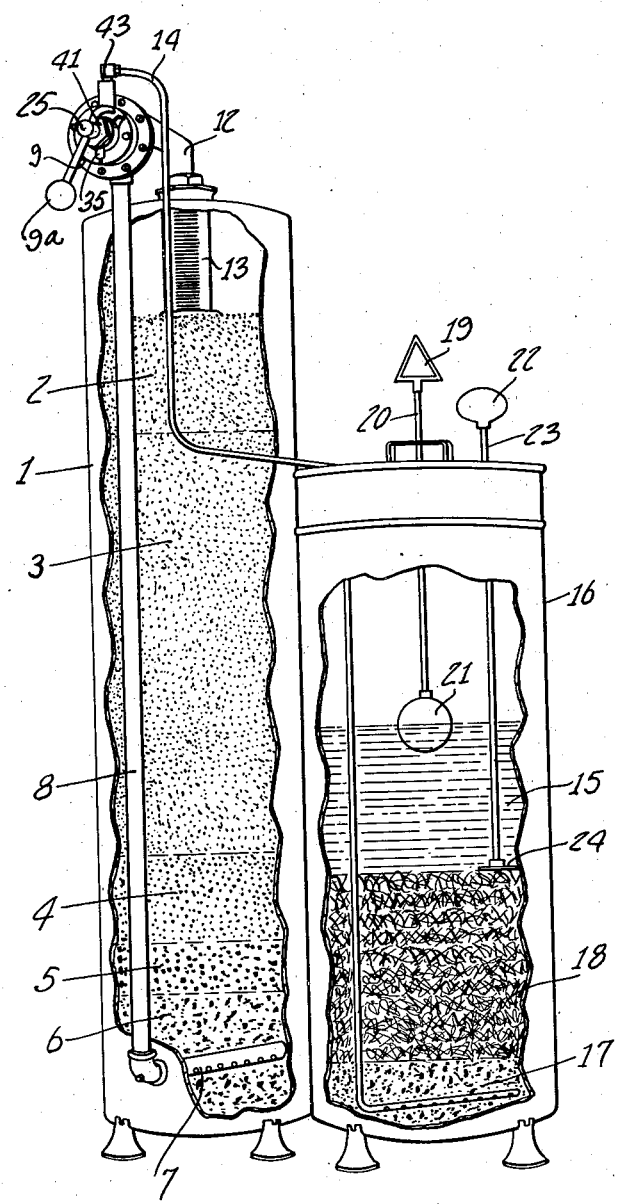
Figure 1 is an outside elevation partially broken away to show the general arrangement of the apparatus.
Figure 2:
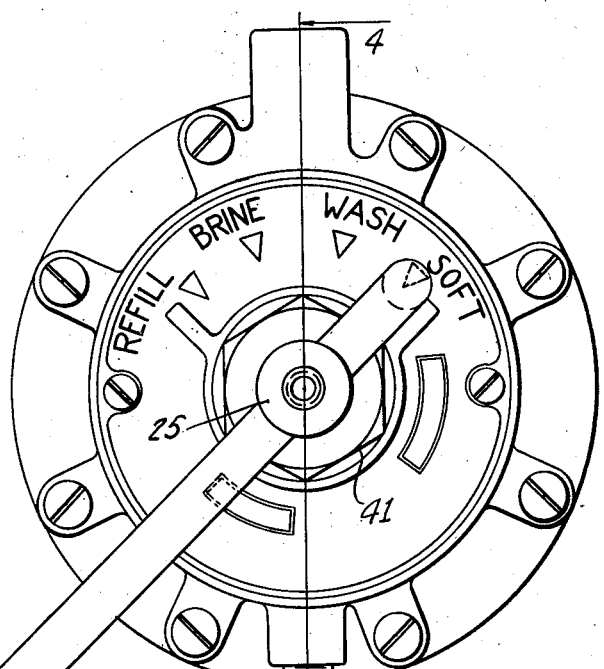
Figure 2 is a detailed front elevation of the single control valve.
Figure 3:
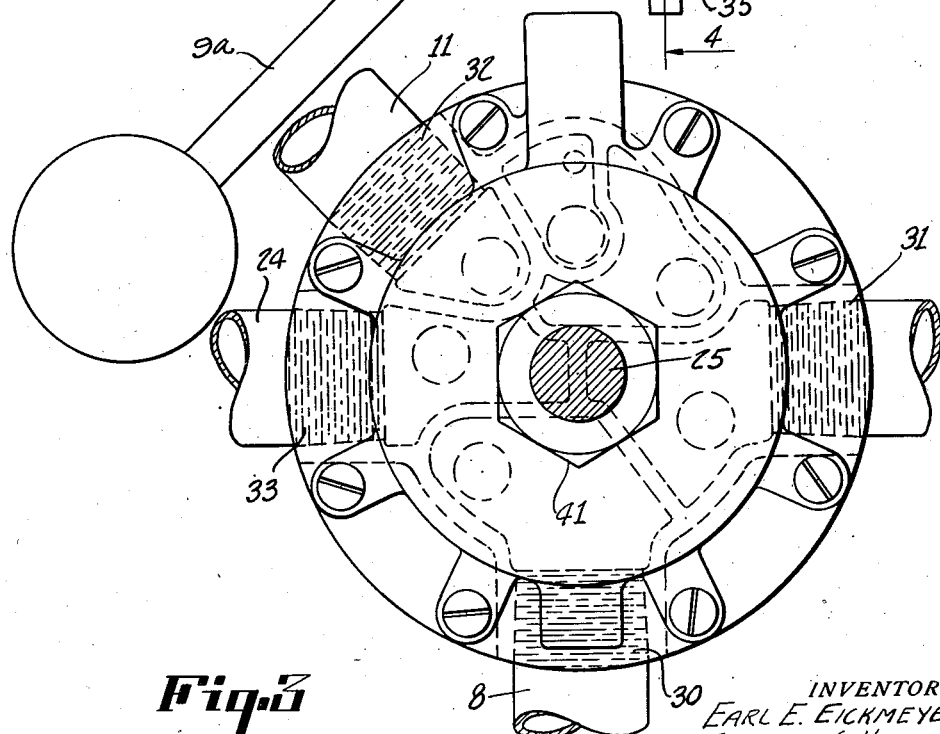
Figure 3 is a front elevation thereof with the rotor shaft in section showing in dotted lines the compartments and ports in the valve.
Figure 14:
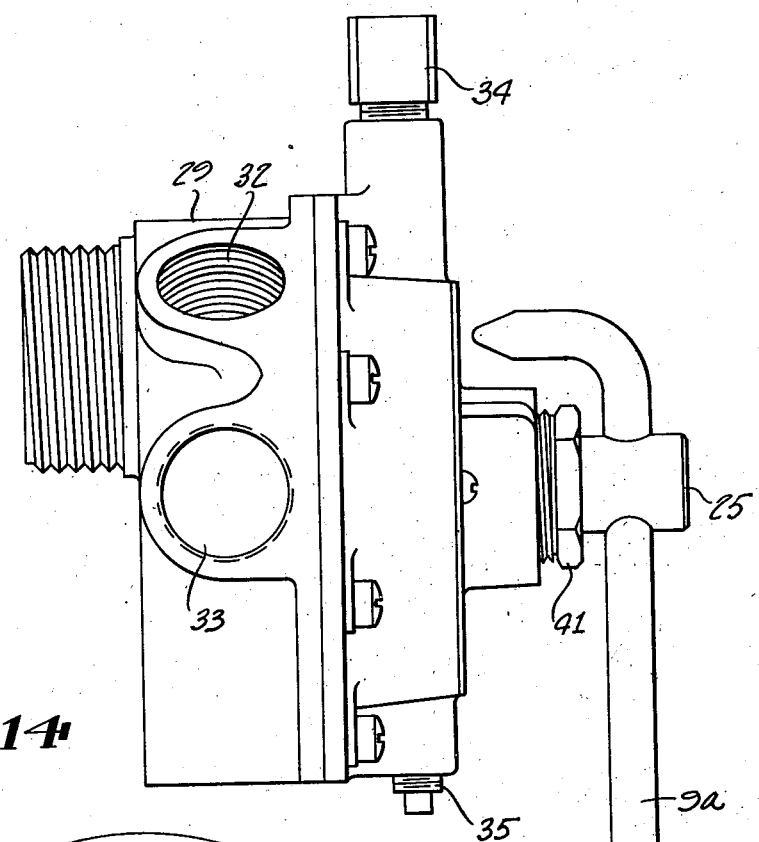
Figure 14 is an elevation from the left-hand side of Figure 2.

Referring to the drawings in detail, the following is a description of the process of washing, softening, brining and refilling.

Process

Referring to Figures 1, 9, 10, 11 and 12 in particular, 1 designates a tank containing the water softening mineral. Starting at the top of the body of mineral, there is a layer of iron-removing mineral 2, then a body of water softening mineral 3 which removes the magnesium and calcium and preferably also removes objectionable materials so far as taste and odor are concerned. Next is a layer of lake sand 4, then a layer of quartz 5, and finally a body of gravel 6. In this body of gravel is located a horizontally disposed perforated pipe 7 through which the liquid in the tank is withdrawn through the pipe 8, whence it enters the control valve 9, the details of which are hereinafter described.

This valve is connected with the pipe 10 which goes to drain for the discharge of the wash waters and brine waters. The city water or hard water line 11 is connected with the valve for supplying the water to be treated, which passes through the valve and thence into the pipe 12 and through the distributor 13 into the top of the tank 1, whence it passes downwardly or upwardly as indicated by the arrows, depending upon the nature of the operation. The valve 9 is connected by the pipe 14 for the purpose of delivering brine 15 from the brine tank 16 to the mineral body to regenerate it. Thereafter the brine with the salts of magnesium and calcium and other foreign materials passes out to drain from the bottom of the tank. The brine tank is provided with a layer of gravel 17, a layer of salt 18, and the salt brine waters 15. The level of these waters is indicated by the pointer 19 on the shaft 20 having the float 21, which is a brine float floating upon the brine 15. The salt level indicator is designated 22. It is mounted upon a shaft 23 which has an enlarged foot 24 resting on top of the salt 18.

Referring particularly to Figure 9, which illustrates the washing operation, the water from the hard water line 11 passes through the valve 9 into the top of the tank 1 and downwardly through the mineral to wash it of any remaining brine and foreign material. This waste water passes out through the pipe 8 and thence through the drain pipe 10 to the sewer. After this operation has been completed, which usually takes approximately 20 to 30 minutes, then the system is ready for the operation to soften water. The handle 9a of the valve 9 is moved into the position shown in Figure 10. In this position the incoming hard water proceeds as heretofore described, except that it is now diverted through the softener and thence to the service pipe 24 so that softened water is delivered to the household or other place where it is consumed.

Figure 12:
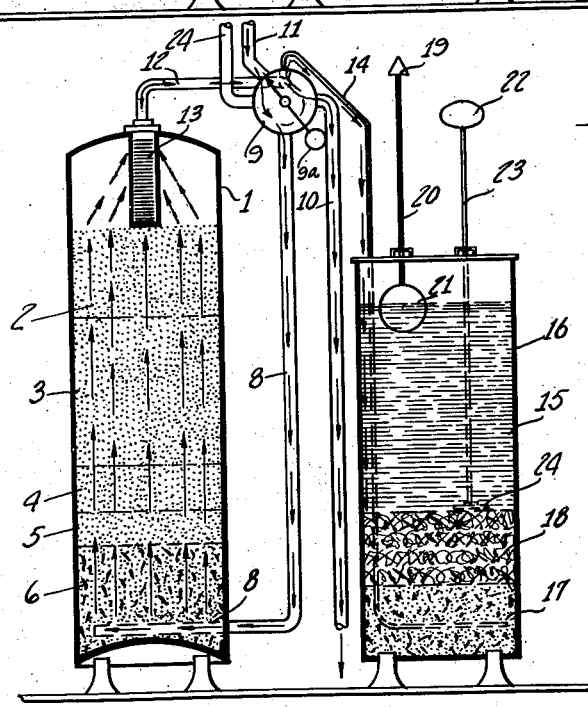
Figure 12 is a similar view showing the direction of flow during the refilling.

This continues until the water is no longer actively softened by the softening mineral 2, whereupon the valve handle 9a is moved into the position shown in Figure 12. The purpose of this is to refill the brine tank 16 so that the level of the water will reach that shown in Figure 12. During this period the hard water from the pipe 11 passes from the valve 9 downwardly through the pipe 8, upwardly through the mineral body in the tank, out the pipe 12 and thence to drain through the pipe 10, thereby washing the accumulation of sediment and other foreign materials out of the tank 1 from the top of the mineral where such materials have accumulated. If the water for washing were conducted downwardly, this foreign material would be drawn into the mineral. By reversing the direction of flow for this washing of the mineral during the refill operation, the mineral is entirely cleaned by reverse flow. At the same time a portion of the water from the line 11 passes through the pipe 14 into the brine tank 16 to refill the brine tank and provide a supply of brine for the brining operation.

Figure 11:
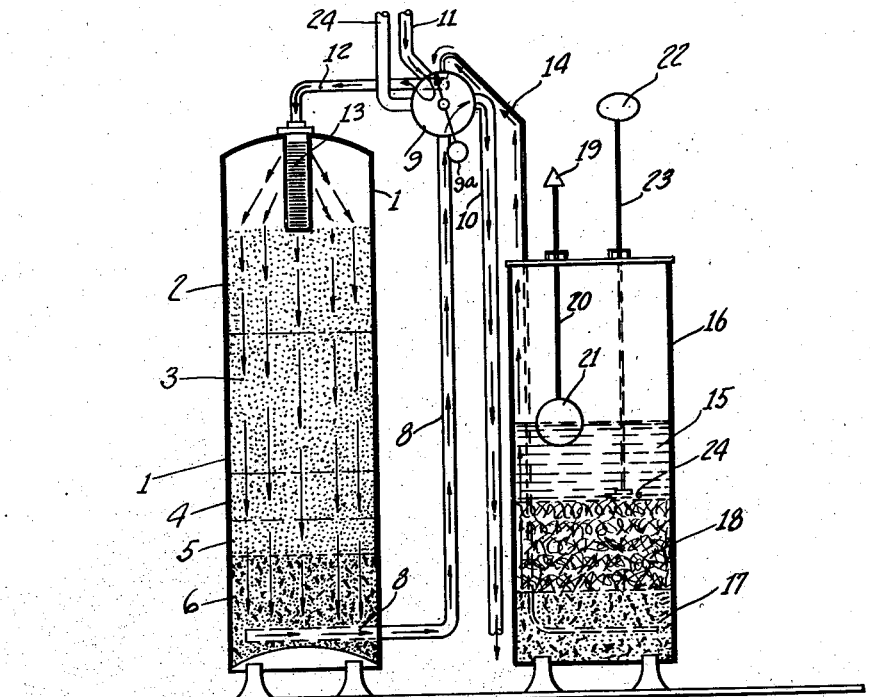
Figure 11 is a similar view showing the direction of flow during regeneration or brining.

Turning to Figure 11, the brining operation is brought about by moving the handle 9a to the position shown, in which position the brine is withdrawn from the tank 16 by the pipe 14 and delivered through the valve 9 to the top of the tank 1 through the pipe 12 and distributor 13. It passes down through the cleaned mineral, out the bottom of the tank 1, up the pipe 8, through the valve 9, and thence to drain through the pipe 10.

Thereafter the washing step of Figure 9 is repeated and then the valve is set in the position shown in Figure 10 for another softening operation.

One of the features of this invention is the dual washing of the mineral bed. It is washed upwardly in reverse direction after softening during refilling to carry away any accumulation of sediment on top of the mineral body, which acts as a filter. Then the reverse washing takes place after brining, which carries out the remaining brine and any remaining foreign materials. In this manner the mineral is thoroughly cleaned in both directions prior to brining and after brining so as not to contaminate or impede the regeneration operation, which would be the case if the mineral body were clogged with sediment that would prevent the ready attack of the brine upon the magnesium and calcium salts of the mineral.

Another advantage of this process is that the valve construction is so arranged that during the washing and refilling, there is no possibility of the discharged washed water getting into the brine tank to contaminate the brine with any sediment being washed away by the wash water.

It will be understood that a variety of different types of valves 9 may be employed which will perform these several operations and it is not desired to confine this invention to any particular mechanism.

However, this invention also comprehends novel features in a valve that has been found practically useful. These features are described hereinafter in connection with the detailed description of the valve and its method of operation, now that the general operation of the system has been described.

*Valve mechanism and method of operation*

Referring to the valve mechanism in detail, the valve consists of several major parts: a valve operating handle 9a which is mounted upon and rotates a shaft 25 on which is mounted a rotor 26, which operates within a cover 27 and which operates against the face 28 of a distribution head 29, the rear end of which is connected to the pipe 12 that in turn is connected to the top of the softener tank 1. The bottom of this distributor head is connected at 30 to the pipe 8, which is connected to the bottom of the softener tank 1. The right-hand side of this distributor head 29 is connected at 31 to the drain pipe 10. The left-hand end side of the distributor head is connected to the hard water pipe 11 at 32 and to the service pipe 24 at 33. The brine pipe 14 is connected through the union 34 to the top of the cover casing 27. The bottom of the cover casing 27 is provided with a plug 35 upon which is mounted a spring 36 that presses inwardly an indexing finger 37 into a shoulder portion 38 of the rotor 26, so that the positioning of the rotor at its several positions by the handle 9a will be indicated by this spring pressed plunger 37 which is adapted to be pressed into a series of depressions on the periphery of the rotor, one each to each position in which the rotor is set for the distribution of water. This rotor turns with the shaft 25 that is supported within the cover 27 in the bearing 39, which is provided with a packing 40 and packing gland 41. A pin 42 mounted in the shaft 25 engages with the inside of the cover 27. The inner end of the shaft 25 is journaled in a recess 43 in one face of the distributor head 29.

Figure 6:
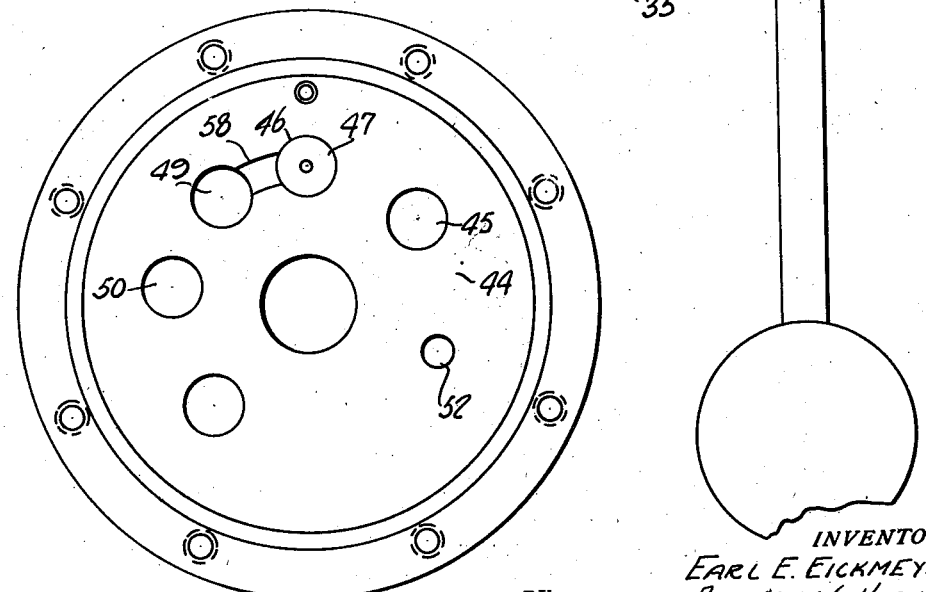
Figure 6 is a section on the line 6—6 of Figure 4 looking in the direction of the arrows.
Figure 13:
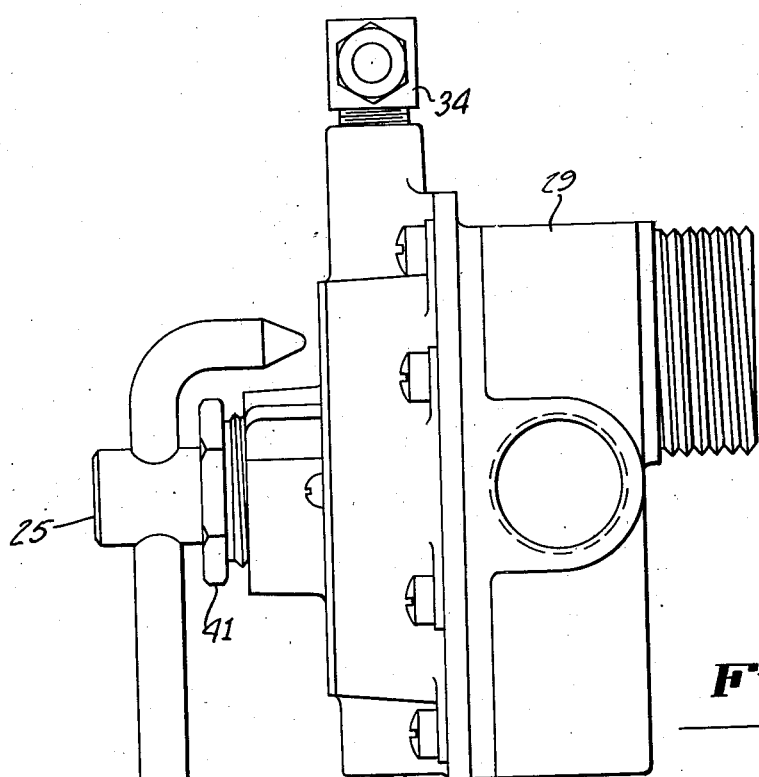
Figure 13 is a side elevation from the right-hand side of Figure 2 showing the arrangement of the valve and its distributor head.
Figure 7:
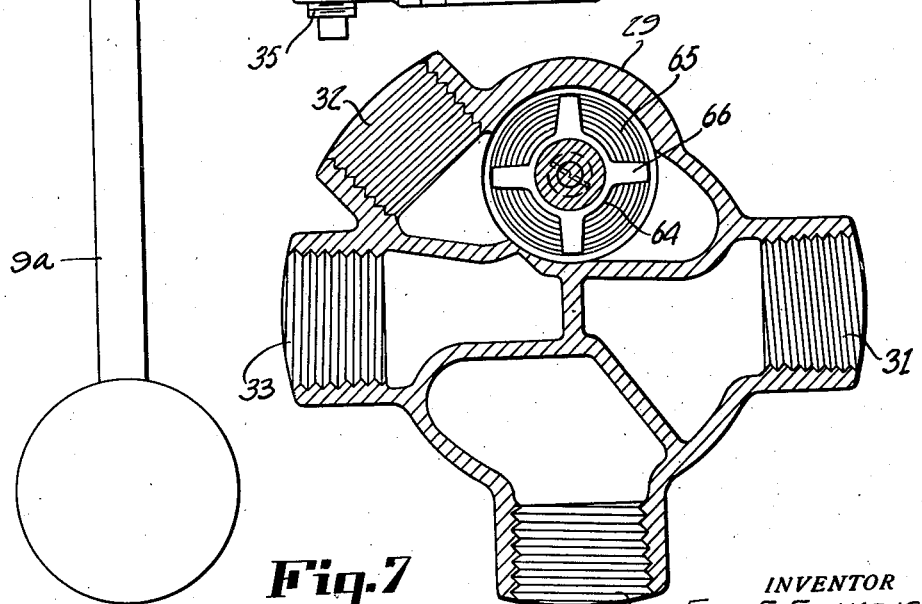
Figure 7 is a section on the line 7—7 of Figure 4 looking in the direction of the arrows.
Figure 8:
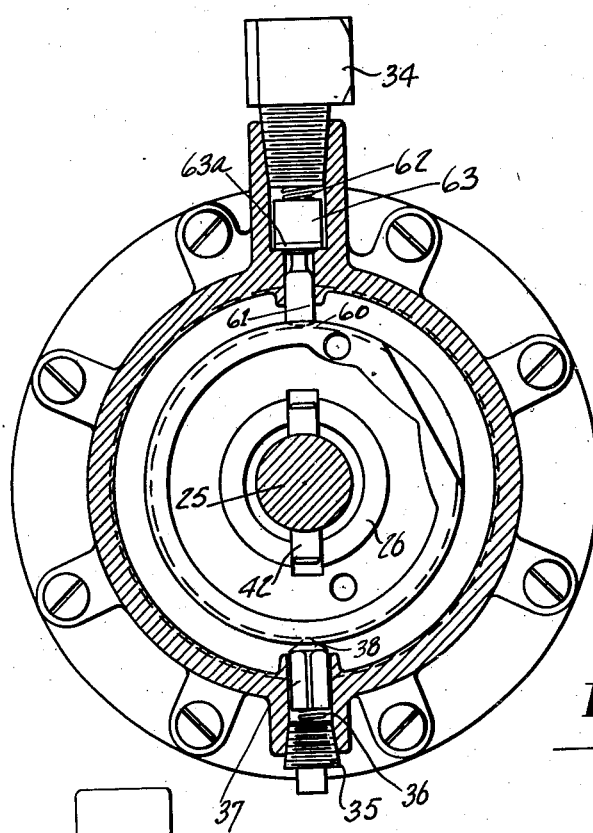
Figure 8 is a section on the line 8—8 of Figure 4 looking in the direction of the arrows.
Figure 17:
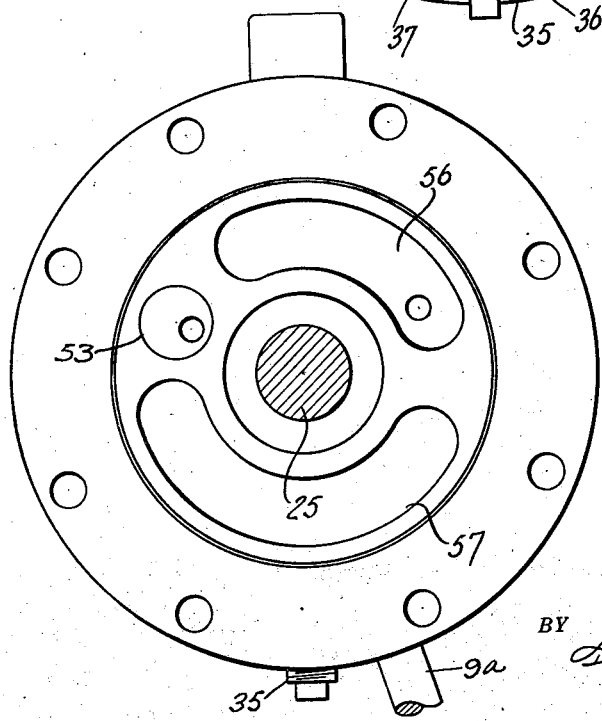
Figure 17 is a section on the line 17—17 looking in the direction of the arrows of Figure 4.

By referring to Figures 6 and 18 to 21, the construction of the rotor, particularly with respect to its face adjacent the distributor head 29 and the positioning of the rotor with respect to the distributor ports, will be observed. In this connection, Figure 6 shows the face 44 of the distributor, which has a plurality of ports which cooperate with the rotor grooves. The relative positioning of the rotor grooves with respect to the distributor ports determines the distribution in this valve of the fluid. The port 45 in the distributor 29 communicates with the top of the softener through pipe 12. Port 46 in the distributor has mounted therein the jet device 47 used in connection with the injector 48, as will be herein described. The port 49 communicates with the hard water line 11. The port 50 communicates with the service pipe 24. The port 51 communicates with the pipe 8 leading to the bottom of the softener. The port 52 communicates with the drain pipe 10.

Figure 18:
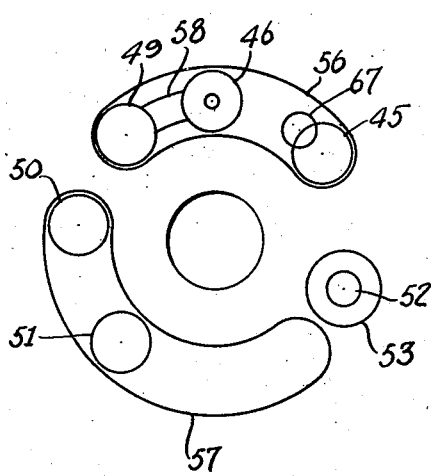
Figure 18 is a diagrammatic view showing the arrangement of the rotor grooves with respect to the distributor ports when the rotor is set in the position for the softening operation, as shown in Figure 10.

Referring to Figures 10 and 18, which illustrate the softening position of the mechanism, the hard water is connected to the top of the softener 1 through the pipe 11. The bottom of the softener 1 is connected by the pipe 8 to the service line 24. The drain 10 is positively closed by a valve mechanism hereinafter described but illustrated particularly in Figure 5, consisting of the spring-pressed plate 53, which is spring pressed by the spring 54, both the plate 53 and the spring 54 being mounted within a chamber 55 in the rotor 27. The parts are so arranged as to bring about down flow of the hard water through the mineral bed in the softener tank 1. In such a position (refer to Figure 18) it will be seen that the rotor groove 56 bridges the ports 45, 46 and 49, while the groove 57 bridges the ports 50 and 51. This permits the water to flow as indicated by the arrows diagrammatically in Figure 10.

Figure 19:
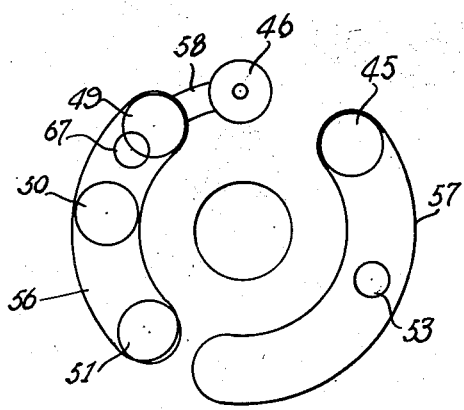
Figure 19 is a similar view showing the parts in position to bring about the refilling operation as shown in Figure 12.

Referring to the refill position of Figure 12 and to Figure 19, which shows diagrammatically the position of the rotor with respect to the distributor during refilling, it will be observed that the groove 56 now bridges the hard water port 49, the service port 50 and the port 51 leading to the bottom of the softener. The jet port 46 is connected by the passageway 58. The groove 57 spans the port 45 and the port 52. In this position the hard water pipe 11 is connected to the jet 47 through the milled slot 58, to the service line 24 and to the bottom of the softener 1 by the pipe 8. The top of the softener 1 is connected through pipe 12 to the drain pipe 10. The flow through the mineral bed is upward. This washes out the sediment from the top of the mineral bed direct to drain without any of this dirty water getting into the refill water for the brine tank. At the same time hard water is being delivered from the pipe 11 through the valve to the pipe 14 to refill the brine tank 16 with additional water to provide another supply of brine for the regeneration operation that will next occur. The hard water for this purpose enters the port 49, passes through the passageway 58, makes its exit through the jet 47 and thence through the passageway 59 into the pipe 14. In order to do this, the cam shoulder 60 on the periphery of the rotor 26 has lifted the pin 61 against the spring 62 and has lifted the valve member 63.

It will be noted that the groove 57 only connects the top of the softener through the port 45 from which the dirty water is moving to the drain 53 and there is no way by which this dirty water could be introduced into the brine tank 16.

Figure 20:
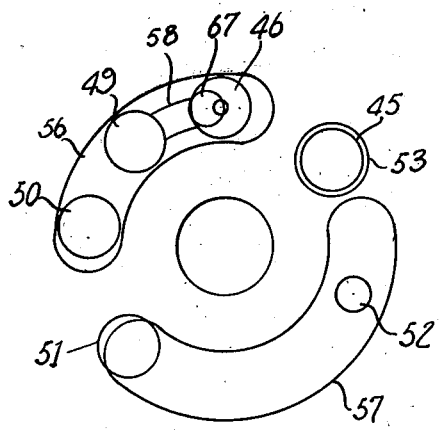
Figure 20 is a similar view showing the parts in position for applying brine to the mineral as in Figure 11.

Referring to Figures 11 and 20, which have to do with the brining position, the groove 57 of the rotor spans the drain opening 52 and the bottom of the softener opening 51. The recess 53 is over the opening 45 leading to the top of the softener. The recess 56 spans the jet opening 46, the hard water opening 49 and the service opening 50. By this arrangement the city water or hard water is connected to the service line for the dwelling using the soft water and the jet opening 46 is supplied with water so as to induce the flow of brine from the brine pipe 14 through the injector to the top of the softener, whence the brine passes through the mineral tank 1, out the bottom through the pipe 8, into the groove 57, thence through the drain opening 52 into the drain pipe 10 to the sewer. The force of this injected water passing through the injector 48 lifts the cover sleeve 64. This cover over the injector is normally closed by the spring 65 pressing against the member 66. The opening to the brine line 14 is effected by the cam surface 60 lifting the pin 61 and thereby opening the valve 63 against the spring 62. This valve has a hard rubber seat 63a engaging with the soft rubber seat 63b, so as to form a tight seal when the valve is closed. In the event the soft rubber wears away, the hard rubber still provides a yielding seal. This is essential to prevent any leakage of water into the brine tank when it is not being refilled because otherwise it might overflow.

Figure 21:
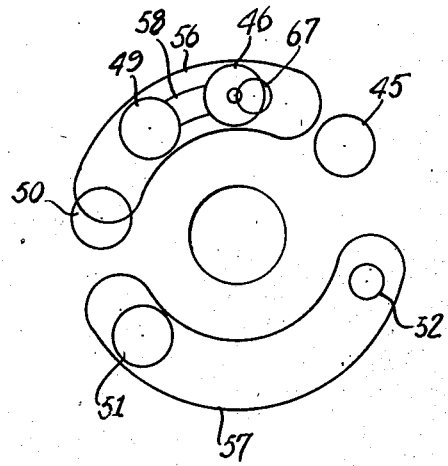
Figure 21 is a similar view showing the parts in washing position such as shown in Figure 9.

Referring to Figures 9 and 21, which illustrate the washing operation, the rotor groove 56 spans the jet opening 46, the hard water line 49, and the service line 50. The groove 57 spans the bottom of the softener line 51 and the drain opening 52. In this position the hard water is connected to the service line and to the injector jet 46. The bottom of the softener is connected by the pipe 8 through the groove 57 to the drain 52. The water is flowing downwardly at this time. In this way the household or other building connected to the service line is being supplied with hard water while the washing operation is washing the accumulated brine and salts of magnesium and calcium from the mineral out to the sewer.

It will be understood that the rotor 26 has water pressure on the back or left-hand face (Figure 4) to cause it to press firmly against the face 28 of the distributor. This is effected by having the water pass through the port 67 from the front of the rotor to behind it.

It will be understood that it is desired to comprehend within this invention such modifications as come within the scope of the claims and the invention.

Having thus fully described our invention, what we claim as new and desire to secure by Letters Patent, is:

1. In a method of water softening, the sequentially carried out steps of (a) passing hard water through a mineral bed in one direction to soften the water; (b) then passing fresh water in the other direction while removing the wash water and accumulated material to drain to wash out any accumulation of foreign material prior to brining while simultaneously replenishing with fresh water a brine supply; and (c) passing brine from said brine supply through said mineral bed to regenerate the same.

2. In a method of water softening, the sequentially carried out steps of (a) passing hard water downwardly through a mineral bed to soften the water; (b) then passing fresh water upwardly through the mineral bed while sending the wash water and accumulated materials in the mineral bed to drain and simultaneously replenishing with fresh water a brine supply; (c) then passing brine from said supply downwardly through said mineral bed to regenerate it; and (d) then cutting off the brine supply and passing downwardly through said mineral bed fresh water to remove the brine and soluble reaction products of the regeneration step therefrom.

3. In a method of water softening, the sequentially carried out steps of (a) passing hard water in one direction through a mineral bed to soften the water and thence to a service line; (b) then passing fresh water in the opposite direction through said mineral bed to wash out impurities from the mineral bed while removing the wash water and accumulated materials thence to drain, and simultaneously passing another portion of fresh water common therewith directly to a salt bed for creating a supply of brine for a subsequent brining operation, and (c) passing brine from said supply of brine in the first mentioned direction through said mineral bed to regenerate the same.

4. In a method of water softening, the sequentially carried out steps of (a) passing hard water in one direction through a mineral bed to soften it and thence to a service line; (b) then passing fresh water in the opposite direction through said mineral bed to wash out impurities from the mineral bed while removing the wash water and accumulated materials thence to drain, and simultaneously passing another portion of fresh water common therewith directly to a salt bed for creating a supply of brine for a subsequent brining operation; and (c) then passing said brine in the first-named direction through said mineral bed and thence to waste, while simultaneously connecting said hard water direct to the service line to maintain service.

5. In a process of regenerating after use a water softener mineral bed the steps carried out sequentially of; (a) washing the mineral bed upwardly with fresh water while carrying thence to the drain the wash water to thereby thoroughly cleanse the mineral bed and remove the accumulated sediment and other foreign materials therefrom, thereby preventing contaminating or impeding the regeneration step to follow, and simultaneously passing fresh water derived from a common source with said fresh water to a brine tank containing salt to refill the same and provide a supply of fresh brine for the brining operation; (b) then passing brine from said brine tank downwardly through the mineral bed to regenerate the same and thence to drain; and (c) then washing the mineral bed downwardly to remove the remaining brine and reaction products of the regeneration step.

EARL E. EICKMEYER.
ANTHONY G. HORVATH.